April 27, 1965     D. L. MEEKS ETAL     3,180,479
CARPENTERS'S ELEVATOR AND CONVEYOR
Filed June 1, 1964     2 Sheets-Sheet 1
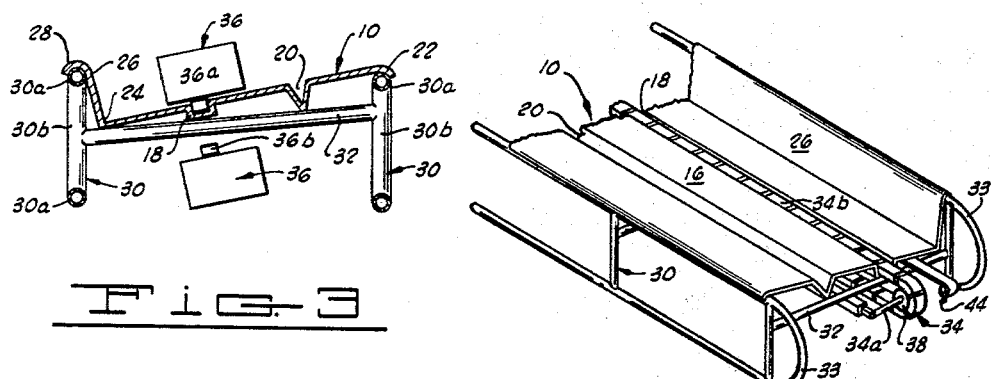
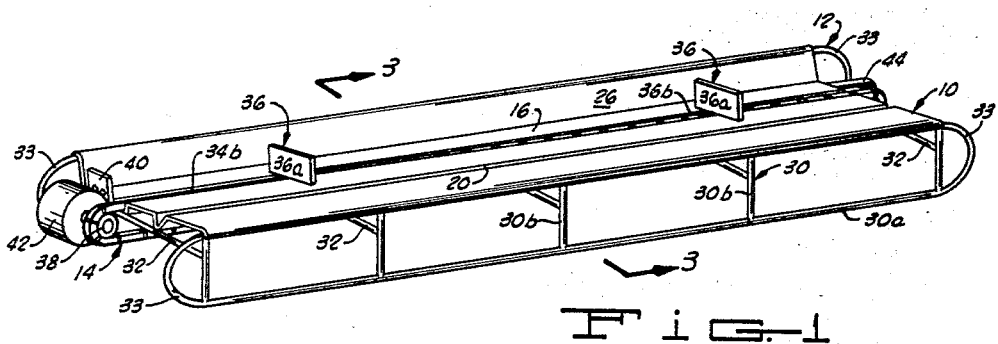
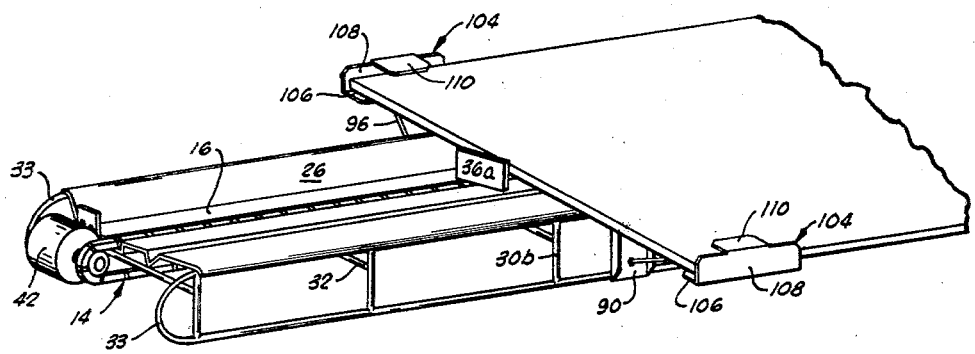
INVENTORS
Donald L. Meeks &
Edwin H. Zemp
BY
*Dunlap & Laney*
ATTORNEYS April 27, 1965　　　　D. L. MEEKS ETAL　　　　3,180,479
CARPENTERS'S ELEVATOR AND CONVEYOR
Filed June 1, 1964　　　　　　　　　　2 Sheets-Sheet 2
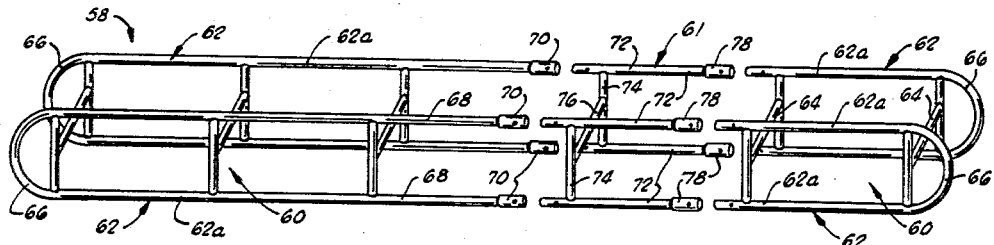
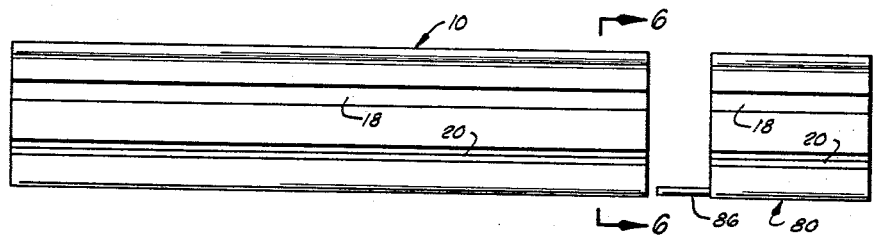
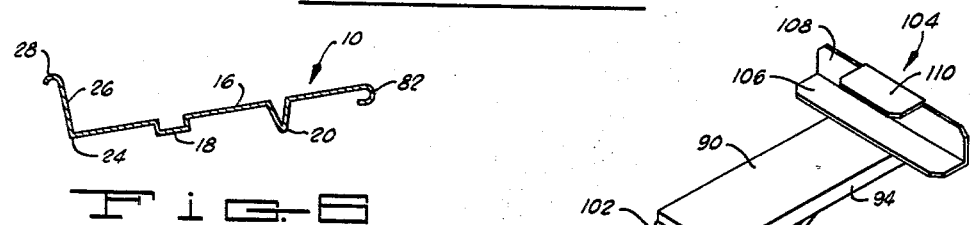
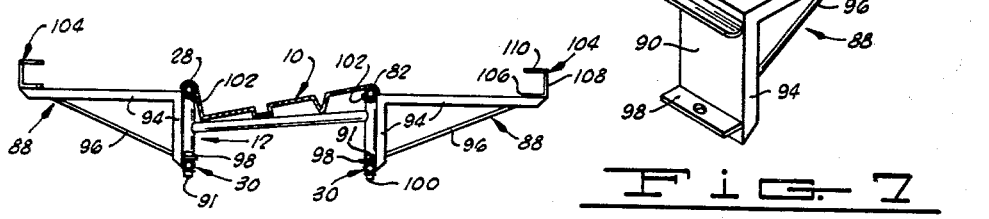
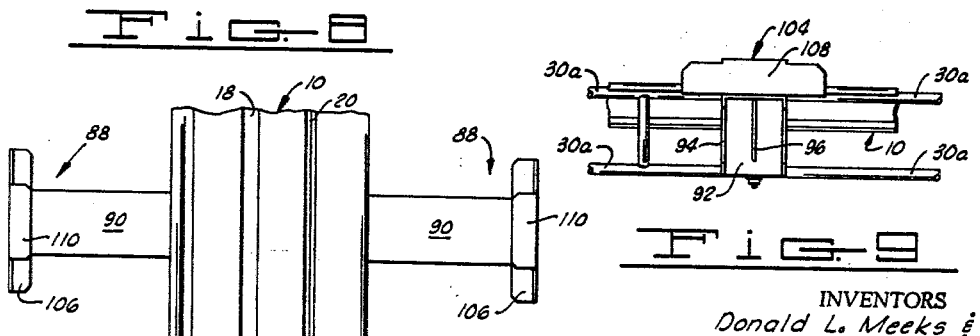
INVENTORS
Donald L. Meeks &
Edwin H. Zemp
BY
ATTORNEYS 3,180,479
CARPENTER'S ELEVATOR AND CONVEYOR
Donald L. Meeks, 514 Virginia St., and Edwin H. Zemp,
2115 Joe St., both of Ponca City, Okla.
Filed June 1, 1964, Ser. No. 371,627
7 Claims. (Cl. 198—108)

This application is a continuation-in-part of our copending application Serial No. 221,236, filed September 4, 1962, and now abandoned.

This invention relates to a device for moving materials. More particularly, but not by way of limitation, the present invention relates to a portable, conveyor-type device which may be used to convey miscellaneous materials from one horizontal position to another, or from one vertical level to a different vertical level. The device is particularly well adapted for utilization by carpenters and construction personnel for transporting various sizes and shapes of construction material from ground level to a higher vertical level for use in constructing buildings and the like.

There are, of course, a myriad of conveying devices which are available to accomplish the conveyance or transport of materials from one location to another as different circumstances may require. To our knowledge, however, there has not previously been designed a conveying device which adequately meets the needs of carpenters, brick masons and other construction personnel who require the movement of materials and tools both from one horizontal location to another, and from the ground to the second or third story of a building under construction. The needs for material conveyance in these circumstances are such that conveyors which have been designed to transport a particular type of material having a constant and uniform shape are inadequate and, in many instances, entirely unsuitable for use in such construction situations. Moreover, since the position in which such a conveyor must be used is subject to considerable variation in the course of such construction operations, conveyors having a fixed position for operation are generally not suitable.

The present invention provides a conveying device which may be appropriately described as a carpenter's elevator and which is highly useful in moving all types and sizes of construction equipment either from one horizontal position to another, or from one vertical level to a different vertical level. The carpenter's elevator of the invention is compactly constructed and its parts are arranged so that construction materials of all sizes and shapes may be easily and quickly repositioned by the use of the elevator. The size and shape of the elevator are such that it may be easily moved from one location to another, a characteristic which makes it especially useful in construction operations where the demand for material transport may shift from one location to another on a day-to-day basis.

In a broader aspect, the present invention comprises a flat, two-ended, elongated supporting member for supporting the material to be conveyed, an elongated framework secured to the material-supporting member and adapted to support the material-supporting member in vertically spaced relation to the ground when the framework is resting flatly thereon, and conveyor means supported by the framework and extending between the ends of the material-supporting member for moving materials placed on the material-supporting member from one end thereof to the other. The framework is provided with opposed rounded end portions which extend beyond the ends of the material-supporting member and function to permit the entire material-moving device or carpenter's elevator to be pivoted or rocked upwardly from a horizontal to a vertical or elevated position as the material-moving device is rested upon the rounded end portions of the framework.

More specifically, the material-supporting member described above as one of the elements of the broad combination of the present invention comprises a two-walled, generally V-shaped, elongated trough having first and second ends. The V-shaped trough is formed by a first, flat, generally rectangular wall which slopes slightly with respect to the horizontal across its transverse dimension, and a second wall which joins the lower longitudinal edge of the first wall. The second wall extends perpendicularly with respect to the first wall and forms a side wall for retaining in position material moved along the first wall. The first wall is provided with an elongated channel which extends throughout the length thereof and which receives one of the reaches of an endless chain conveyor so that the conveyor chain moves below the major plane of the material-supporting surface of the first wall. By virtue of this arrangement, the chain does not interfere with the freely sliding movement of material along the material-supporting surface of the first wall.

The conveyor chain carries a plurality of flights which project upwardly therefrom so that material resting in the V-shaped trough formed by the two walls may be engaged by such flights and moved from one end of the trough to the other. In a preferred embodiment of the invention, the flights are detachably secured to the endless chain of the conveyor so that if it should be desirable to merely slide material from an upper level to a lower level, this may be effected by simply placing the material in the trough and removing the flights from the conveyor chain so that the sliding movement of such material to the lower vertical level is unobstructed.

In addition to the provision of the channel in the first wall of the V-shaped trough for the accommodation of one reach of the endless chain conveyor, an elongated V-shaped groove is also provided in the side of the V-shaped trough which carries such channel, and, like the channel, extends throughout the length of the trough parallel to such channel. The V-shaped groove adds structural strength to the side of the V-shaped trough in which it is located, and also affords a convenient conduit to permit small, easily lost articles, such as nuts, bolts, screws, nails, roofing tacks and the like to be slid down the material-moving device from the upper end thereof to the lower end thereof when conveyance of this material is desired.

The elongated framework which is utilized to support the generally V-shaped, elongated trough is constructed for maximum compactness, lightness and structural strength and comprises a pair of generally rectangular lattice members which are spaced horizontally from each other and interconnected by a plurality of transverse braces. The transverse braces which interconnect the generally rectangular lattices are connected to the lattices so that the braces slope slightly with respect to the horizontal when the rectangular lattices are resting in an upright position upon the ground. The inclination of the braces with respect to the horizontal permits them to be utliized to provide additional support for the generally V-shaped trough, in addition to structurally interconnecting the horizontally spaced, rectangular lattice members. A pair of the braces located at opposite ends of the elongated trough also function to support sprockets which engage the endless chain of the conveyor and through which the chain is driven. A motor is suitably secured to the framework of the material-moving device and is drivingly connected to one of the conveyor chain sprockets.

From the foregoing description of the invention, it will be apparent that a major object of the present invention is to provide a compact, mechanically strong, portable material-moving device which is especially well adapted for use by carpenters, brick masons and other construction personnel in conveying construction materials from one location to another.

An additional object of the present invention is to provide a carpenter's elevator or construction material-moving device which may be utilized to convey miscellaneous construction materials of varying sizes and shapes either from one horizontal location to another horizontal location, or from one vertical level to a different vertical level.

An additional object of the present invention is to provide a material-moving device which may be easily skidded along the ground from one horizontal location to another by virtue of the provision at each end thereof of runners which are arcuately curved to permit the device to be easily passed over obstructions on the ground.

An additional object of the present invention is to provide a material-moving device which may be easily raised from a horizontal to a vertical or inclined position by only one or two persons.

Another object of the present invention is to provide a material-moving device which may be easily loaded with materials of varying sizes and shapes and which can be dually utilized for automatically lifting material from one level to another, or alternately, for permitting material to be slid down an inclined plane from one vertical level to another.

Another object of the present invention is to provide a material-moving device which permits large bulky objects to be conveyed from one location to another and to be easily unloaded from the device upon arrival at the point where it is desired to unload such objects from the device.

A further object of the present invention is to provide a material-moving device which is especially well adapted for use in moving miscellaneous sizes of construction materials from one position to another, which device is characterized by a long and trouble-free service life and relatively low fabrication costs.

The foregoing objects and advantages will be better understood, and other objects and advantages of the present invention will be perceived to exist when the following detailed description of the invention is read in conjunction with a perusal of the accompanying drawings which illustrate our invention.

In the drawings:

FIGURE 1 is a perspective view of the material-moving device or carpenter's elevator of the present invention.

FIGURE 2 is an enlarged perspective view of one end of the material-moving device of the present invention showing the details of construction of the idler sprocket utilized to support the endless chain conveyor, and the narrow, elongated metallic strip which is utilized to support material as it moves off the end of the material-moving device and to facilitate the handling of the material as it is discharged from the device.

FIGURE 3 is a section taken along line 3—3 of FIGURE 1.

Referring now to the drawings in detail and particularly to FIGURE 1, the material-moving device of the invention may be described as generally comprising an elongated, generally V-shaped trough 10 for receiving and supporting material to be moved or conveyed by the device, a framework 12 for supporting the V-shaped trough 10 in an exposed position at the upper side of the framework and in spaced relation from the ground when the framework rests flatly in a horizontal position thereon, and conveying means 14 which is secured to the framework 12 and which is utilized for moving material resting in the V-shaped trough 10 from one end thereof to the other.

Referring now to the structural details of each of the major elements of the present invention as enumerated in the preceding paragraph, the generally V-shaped, material-receiving trough 10 may be constructed of any suitable material, such as plastic, wood or metal having sufficient structural strength to carry the types of materials which it is anticipated will be handled by the material-moving device. A sheet metal construction of the V-shaped trough 10 is, however, preferred. The trough 10 comprises a relatively wide bottom wall 16, which, in the preferred embodiment illustrated in FIGURE 1, is generally rectangular in shape and is of substantially greater length than width. The bottom wall 16 of the V-shaped trough 10 is provided with a pair of elongated indentations or recesses therein which are indicated by reference numerals 18 and 20.

The elongated recess 18 comprises a generally rectangular channel which is formed in the upper surface of the bottom wall and is dimensioned to accommodate one of the reaches of the endless chain of the conveyor means 14 in a manner hereinafter described. The elongated recess 20 which is formed in the bottom wall 16 of the V-shaped trough 10 is generaly V-shaped in cross section and functions to reinforce and enhance the structural strength of the bottom wall 16. The elongated V-shaped groove 20 is deeper than the rectangular channel 18 as shown in FIGURE 3 and, as will be subsequently described, provides additional points of contact with the framework 12 to afford additional support of the V-shaped trough 10 upon the framework. Finally, the V-shaped groove has a useful purpose during the operation of the material-moving device in that small, easily lost articles, such as nails, bolts, screws and nuts may be placed in the groove 20 at a higher vertical level and allowed to slide down the bottom wall 16 to a lower vertical level.

The bottom wall 16 of the V-shaped trough 10 is secured at one of its longitudinal edges 22 to the upper edge of one side of the framework 12 and is inclined or sloped slightly with respect to the horizontal when the framework is resting flatly upon the ground or other horizontal surface. This arrangement is most clearly illustrated in FIGURE 3 of the drawings. It will be readily apparent that material placed upon the bottom wall 16 of the elongated V-shaped trough 10 will be inclined to move toward the lower side of the bottom wall 16 rather than to fall off the material-moving device by moving upwardly and over the upper edge 22 of the bottom wall.

At the lower longitudinal edge 24 of the bottom wall 16 of the V-shaped trough 10, the bottom wall is joined to a side wall 26 which extends perpendicularly upward therefrom and is welded to the upper edge of the framework 12 along one of its longitudinal edges 28. (See FIGURE 3).

The framework 12 upon which the elongated, generally V-shaped trough 10 is supported comprises a pair of horizontally spaced framework elements which in the illustrated embodiment take the form of lattice members 30 which are interconnected by a plurality of rigid cross braces 32. The cross braces 32, like the bottom wall 16 of the elongated, generally V-shaped trough 10, are inclined with respect to the horizontal when the framework is resting flatly upon the ground or other horizontal surface. The inclination of the cross braces 32 is best shown in FIGURE 3. It will also be perceived, however, in referring to FIGURE 3, that the slope of inclination of the braces 32 with respect to the horizontal is not as great as the inclination of the bottom wall 16 of the trough 10 so that a three-point support of the bottom wall 16 upon the braces 32 is provided by the V-shaped groove 20, the rectangular channel 18, and the meeting edges of the bottom wall 16 and the side wall 26. This arrangement prevents the bottom wall 16 of the trough 10 which, in practically all instances will carry the greater portion of the load of material being conveyed, from being flattened or bent out of a monoplanar configuration by unusually heavy loading.

In FIGURES 1 and 2, it may be perceived that each of the lattice members 30 is generally rectangular in configuration and comprises a pair of elongated tubular members 30a which are connected by a plurality of tubular cross members 30b. The cross members 30b are welded, brazed or otherwise suitably secured to opposite ends of the inclined braces 32 which are employed to support the trough 10, and to interconnect and maintain the spacing between the lattices 30.

Secured to the generally rectangular lattices 30 at each end thereof and projecting therefrom in the same plane as that occupied by the lattices are a pair of arcuate runners or rockers 33. In a preferred embodiment of the invention, the arcuate rockers 33 are of tubular metal construction, and are generally semicircular in configuration. It will be apparent, in referring to FIGURE 1, that the diameter of the semicircular rockers 33 is substantially equivalent in dimension to the transverse distance between the elongated tubular members 30a of the lattices 30. It will also be noted, in referring to FIGURES 1 and 2, that the semicircular tubular members forming the arcuate rockers 33 at the end of the lattices 30 project a substantial distance beyond the ends of the lattices and also beyond the ends of the elongated generally V-shaped trough 10 which is substantially coextensive with the lattices 30.

The conveying means 14 of the material-moving device of the present invention comprise an endless chain 34 having a lower reach 34a which extends beneath the bottom wall 16 of the V-shaped trough 10 and an upper reach 34b which extends through the channel 18 formed in the upper surface of the bottom wall 16. The relative sizes of the conveyor chain 34 and the generally rectangular channel 18 are such that no portion of the conveyor chain protrudes above the major plane or material-supporting surface of the lower wall 16 of the trough 10. Thus, when the material-moving device of the invention is vertically inclined, flat-bottomed articles or materials of construction may be slid along the bottom wall 16 of the trough 10 without encountering interference afforded by the conveyor chain 34. However, for the purpose of permitting materials resting on the bottom wall 16 of the trough 10 to be engaged by the conveyor means 14 and moved automatically from a lower elevation to a higher elevation or from one horizontal position to another, a plurality of flights 36 may be detachably secured to the conveyor chain 34 for movement with the chain relative with the bottom wall 16. The flights 36 each include a generally rectangular plate 36a which is substantially wider than the rectangular channel 18 and functions to engage the material to be moved along the bottom wall 16. A projection or lug 36b is formed on the rectangular plate 36a and extends downwardly for connection to the endless chain 34 of the conveyor means 14. It is to be understood, of course, that in a preferred embodiment of the invention, the flights 36 may be quickly and easily detached from the endless chain 34 when it is desired to use the material-moving device of the invention simply as an inclined plane to permit materials to be slid from a higher to a lower elevation.

The remaining components of the conveyor means 14 comprise a pair of sprockets 38 which are supported adjacent each end of the V-shaped trough 10 upon the braces 32 in the manner illustrated in FIGURE 2. Suitable means are provided for adjusting the position of the sprockets relative to the V-shaped trough 10 so that the tension in the endless chain 34 may be adjusted as desired. Drivingly connected to one of the sprockets 38 and supported by a bracket 40 secured to one of the braces 32 is a suitable motor 42. It will be noted, in referring to FIGURES 1 and 2, that the sprockets 38 and motor 42 are of a size and location such that they are positioned inwardly of the semicircular tubular members 33. In other words, when the material-moving device of the invention is stood on either of its ends in a vertically extending position, the device will be supported upon the semicircular tubular members 33 at its lowermost end and may be rocked or pivoted on such members without the motor 42 and sprockets 38 affording any interference with such rocking movement.

At the same end of the trough 10 at which the motor 42 is located, and positioned adjacent the upper edge 22 of the trough 10, is a post or peg 46 which is detachably secured to the framework 12 and projects upwardly from the trough 10 to stabilize the material placed at that end of the carpenter's elevator for movement upward to a higher level.

At the end of the generally V-shaped trough 10 opposite the motor 42, a narrow, elongated metal band 44 is secured at one of its ends to the inclined brace 32 at the end of the bottom wall 16 of the trough at a point adjacent the channel 18. The band 44 is bent downwardly and secured at its other end to a cross member 45 which is connected at its ends to the semicircular tubular members 34.

*Operation*

The material-moving device or carpenter's elevator of the present invention may, as has been previously indicated, be utilized for conveying materials from one horizontal position to another, or alternately, from one vertical level to a different vertical level.

When the device is operated for the former function, the lattice members 30 are rested with the lowermost elongated tubular members 30a of each positioned flatly upon the ground so that the elongated, generally V-shaped trough 10 is spaced vertically from the ground. Lumber, roofing, shingles, paint or other materials may then be placed upon the bottom wall 16 at the end of the device and motor 42 then actuated to drive endless chain 34 through the instrumentality of the sprockets 38. The motor will, of course, be driven in a direction such that the upper reach 34b of the chain 34 moves from that end of the device at which the material is located to that end to which it is desired to deliver the material.

One or more of the flights 36 are then attached at desired locations along the endless chain 34 and engage the material placed on the bottom wall 16 of the elongate, generally V-shaped trough 10. The flights 36 move with the conveyor chain 34 and force the material to move along the length of the V-shaped trough 10. The inclination of the bottom wall 16 with respect to the horizontal assures that materials placed in the trough 10 for conveyance from one position to another will not slip off the bottom wall 16 or fall off the material-moving device. This is true even though such materials may have a rounded or arcuate bottom surface and be inclined to roll across the bottom wall. The side wall 26 of the V-shaped trough 10 will, of course, retain materials in the trough and prevent them from being displaced from the lower side of the sloping bottom wall 16. It will be perceived that the generally V-shaped construction of the trough 10 wherein the bottom wall 16 of the trough is of substantially greater transverse width than the side wall 26 provides adequate confinement of the material conveyed without the necessity of providing a third wall which would limit the size and shape of cargo which might be transported by the material-moving device.

When it is desired to move the material-moving device of the invention from one location to another, this may be accomplished by using the arcuate or semi-circular tubular members 33 at each end of the device as handles for gripping the device to pull it across the ground. The semicircular tubular members 33 also permit the device to be hoisted to an inclined position during such transport from one location to another without sharp points or edges at the lower end of the device digging into the ground or becoming fouled upon obstructions, such as boards, cables or bricks lying upon the ground as the device is slid therealong.

Although it is contemplated that the device of the present invention may be constructed with a reversible motor 42 utilized to drive the endless chain 34 of the conveyor means 14, it will usually be adequate to use the arrangement of the preferred embodiment of the invention illustrated in FIGURE 1 in which a unidirectional motor 42 is provided and the endless chain 34 functions in all instances to convey material from the end of the device at which the motor 42 is located to the opposite end thereof. In such preferred embodiment, the narrow elongated metal member 44 which extends outwardly from the end of the V-shaped trough 10 functions to support the cargo or material being conveyed after it has reached the end of the generally V-shaped trough 10 and has been pushed out of the trough by the flights 36 secured to the chain 34. Because of its narrow dimension, the elongated metal member 44 facilitates the unloading of the materials since more of the surface and edges of the material will be exposed for gripping by workmen, or for the securement of certain types of unloading devices in the case of heavier materials. The narrow, elongated strip of metal 44 also provides a handle to grasp when positioning one end of the material-moving device, and provides a skid to permit the end of the device carrying the metallic strip to be glided more easily into position when that end of the device is being positioned at a certain vertical level by a workman standing on the ground.

As hereinbefore indicated, the material-moving device or carpenter's elevator of the invention may be utilized for moving material from one vertical level to another, as well as for shifting material between horizontal locations on the ground. In moving the device from a horizontal to an elevated or inclined position, a workman need only butt the semicircular tubular members 33 at one end of the device against the ground and pivot or rock the remainder of the device about such semicircular tubular members while the device rests thereon. The upper end of the device may then be skidded across a parapet or rooftop without damaging the roof or becoming fouled and immovable as would be the case were sharp or abrupt ends provided on the device instead of the semicircular tubular members 33.

Once the device has been positioned in a vertical or inclined position, the conveyor means 14 may be utilized to elevate material in substantially the same manner as has been hereinbefore described for the horizontal operation of the device. As an alternate function of the material-moving device of the invention, however, the flights 36 which are normally detachably secured to the endless chain 34 may be detached from the chain and the V-shaped trough 10 used primarily as an inclined plane for permitting articles to be slid downwardly from the upper vertical level at one end of the device to the ground or such lower vertical level as supports the lower end of the device. In many instances, it might be desirable to move liquids, such as water, or quasi-fluid materials, such as sand, from the upper to the lower level. This may be accomplished easily as a result of the V-shaped configuration of the trough 10, or it may be desirable in many instances to utilize the V-shaped groove 20 formed in the lower wall 16 of the V-shaped trough to convey such materials. The V-shaped groove 20 also provides a convenient conduit for passing small, easily lost materials, such as tacks, nails, screws and the like, from an upper level to the ground during construction operations.

From the foregoing description of the invention, it will be apparent that the present invention is characterized by a number of structural features which make it especially well-suited for use by carpenters, brick masons and other personnel who are engaged in construction operations where work is to be done at different vertical levels, as well as at different horizontal locations. The device is versatile and affords a means of conveying materials of varying sizes and shapes in a rapid and automatic manner from one position to another. Moreover, the construction of the device is such that it may be easily conveyed from one construction site to another or from one location to another at the same construction site. The device is very strong mechanically and is characterized by a trouble-free operating life. Nevertheless, simplicity and economy of construction also characterize the device so that it may be manufactured at relatively low cost and may be afforded by the average craftsman who would find such a device useful.

Parts of a modified embodiment of the invention are illustrated in FIGURES 4, 5 and 6. The modifications contemplated in this form of the invention are primarily related to the provision of a structure which permits the length of the framework 12 and V-shaped trough 10 to be varied in order to permit the material-moving device to be made longer. Thus, the device may be accommodated to circumstances in which the level to which it is desired to raise or transfer materials is higher than that ordinarily encountered. As illustrated in FIGURES 4 and 5, the modified framework 58 comprises three parts which may be designated as a pair of end portions 60 and an extension portion 61. The two end portions 60 are constructed substantially identically to the end portions of the framework 12 illustrated in FIGURE 1 and are thus each provided with a pair of horizontally spaced, generally rectangular lattice members 62 which are interconnected with rigid cross braces 64. An arcuate runner or rocker 66 is secured to one end of each of the lattices 62 and is preferably of tubular metal construction and semicircular geometric configuration. The rectangular lattices 62 of each of the end portions 60 each include a pair of elongated parallel tubular members 62a. The elongated parallel tubular members 62a of the lattices 62 at one of the end portions 60 each carries an enlarged tubular segment 70.

The extension portion 61 of the framework 58 includes four elongated tubular members 72 which are positioned along the edges of an imaginary right parallelepiped and are interconnected by means of transverse tubular members 72 carrying enlarged tubular segments 78 which are of a size to permit them to be telescoped over the elongated tubular members 62a in the lattices 62 of one of the end portions 60. In the use of the described structure, the extension portion 61 can be telescoped between the two end portions 60 of the framework 58. Alternatively, when the extension portion 61 is not required to impart the desired length to the material-conveying device, this portion of the framework 58 can be removed and the two end portions 60 joined together in telescoping relation.

In order to accommodate the V-shaped trough to the length of the extended framework 58, a trough extension portion 80 is provided. It is preferable also to modify the trough structure 10 illustrated in FIGURES 1 through 3 by turning the upper edge 82 of the bottom wall 16 of the trough structure through slightly more than 180° to form a socket for receiving a semicylindrical protuberance 86 carried by the trough extension 80. The protuberance 86 will fit around the elongated tubular member 68 of the lattices 62, but will telescope inside the socket formed by upper edge 82 of the trough 10. In all other respects, the normally used, regular length portion of the V-shaped trough 10 is identical to the structure illustrated in FIGURES 2 and 3, and identical reference numerals have therefore been used to identify the bottom wall 16, the elongated recess 18, the V-shaped recess 20, the side wall 26, lower longitudinal edge 24 and longitudinal edge 28.

In the use of the trough extension portion 80, the regular length trough 10 is placed in position on the framework 58 after the framework has been assembled with the extension section 61 in position as previously described. The trough extension 80 is then secured on the framework at one end thereof and is slid along the framework until the semicylindrical projection 86 interlocks with the socket formed by the curved upper edge 82 of the V-shaped trough 10.

An additional useful modification of the present invention is illustrated at FIGURES 7 through 11. Basically, this modification of the fundamental structure of the invention entails the provision of a pair of oppositely disposed wing guides 88 which are detachably connected to the oposite sides of the framework 12 for the purpose of permitting large flat sheets of material, such as plywood or wallboard, to be transferred by the material-moving device of the invention. In FIGURES 8 through 11, the wing guides 88 are shown secured in position on the framework 12. Each of the wing guides includes a flat material-supporting plate 90 to which is secured at substantially a right angle, an abutment plate 92 which abuts against the elongated tubular members 30a of the lattice members 30.

To enhance the structural strength of the wing guides 88, the material-supporting plate 90 and the abutment plate 92 are preferably of channel or U-shaped cross-section, each thus having flanges 94 welded or otherwise suitably secured along the longitudinal edges. Preferably, the supporting plates 90 and abutment plates 92 are formed from a single metallic plate. Diagonal braces 96 interconnect the supporting plates 90 and abutment plates 92 and further increase the structural strength of the wing guides 88. At the lower edge of each abutment plate 92, an apertured, inwardly extending flange 98 is provided on the respective wing guides for engaging at one point the lattice members 30 of the framework 12. Suitable bolts 91 or other connecting means are extended through the apertures in the flanges 98 and mating apertures which are provided in the lowermost tubular member of the respective lattice member 30 to secure the wing guides 88 to the framework 12. Of course, the longitudinal position of the wing guides 88 on the framework 12 may be adjusted as desired by providing a plurality of bolt holes or apertures in axially spaced relation along the lower tubular members 30a of the two lattice members 30.

Adjacent the upper edge of the abutment plates 92 are secured a pair of inwardly extending, arcuate retaining plates 102 which engage the under side of the tubular members 30a forming the upper side of each of the lattice members 30. A second point of securement to the framework 12 for each of the wing guides 88 is thus provided. With the two wing guides 88 secured to the framework 12 in this manner, the supoprting plates 90 of the two wing guides occupy a common plane which is even with or includes the upper edges 28 and 82 of the V-shaped trough 10.

A channel guide designated generally by reference character 104 is secured at the outer edges of each of the supporting plates 90 for the purpose of retaining and guiding large flat pieces of construction material, such as plywood, wall board or sheet rock, as such flat pieces are moved from one position to another by the material-moving device of the invention. Each of the channel guides 104 includes an elongated base plate 106, a web portion 108 and an upper guide plate 110. The upper guide plate 110 is preferably constructed substantially shorter than the base plate 106 and, in the illustrated embodiment of the invention, is of approximately the same width as the support plates 90 of the wing guides.

The manner in which the wing guides 88 function to facilitate the conveyance or transfer of large flat materials, such as plywood or wallboard, as best illustrated in FIGURE 11. It will be perceived that at the outset of the transfer of the material, its oppositely disposed longitudinal edges are passed through the channel guides 104 carried at each outwardly disposed edge of the support plates 90. The conveying means 14 (not shown in the modified embodiments of FIGURES 4 through 11) is then actuated, and the bottom edge of the plywood is engaged by the rectangular plate 36a carried by the upper flight 36 of conveyor chain 34. As the plywood moves upwardly along the framework 12, it is constantly guided and retained in position by the wing guides 88. The support plates 90 afford lateral support to the plywood, and the channel guides 104 both guide the plywood and prevent it from slipping sideways on the support plates 90.

From the foregoing description of the invention, it will be apparent that the present invention is characterized by a number of structural features which make it especially well-suited for use by carpenters, brick masons and other personnel who are engaged in construction operations where work is to be done at different vertical levels, as well as at different horizontal locations. The device is versatile and affords a means of conveying materials of varying sizes and shapes at a rapid and automatic manner from one position to another. Moreover, the construction of the device is such that it may be easily conveyed from one construction site to another, or from one location to another at the same construction site. The device is very strong mechanically and is characterized by a trouble-free operating life. Nevertheless, simplicity and economy of construction also characterize the device so that it may be manufactured at relatively low cost and may be afforded by the average craftsman who would find such a device useful.

Although a preferred embodiment of the invention has been described in detail herein and is illustrated in the drawings, such description and illustration have been intended as exemplary only, and are not considered to limit the scope of the invention to the precise details described. Certain modifications and innovations may be made in the preferred embodiment described without departure from the basic principles underlying the invention and to which claim is hereinafter made. It is therefore our intention that the spirit and scope of the present invention shall be construed to include such modifications and innovations except as such spirit and scope are necessarily limited by the language of the appended claims.

We claim:
1. A portable material-moving device for horizontally and vertically conveying miscellaneous materials comprising;
  (a) a pair of horizontally spaced, elongated framework elements each having a first end and a second end;
  (b) brace means interconnecting said framework elements and extending horizontally between said framework elements when said framework elements rest upon the ground and extend in generally vertical directions;
  (c) a first, elongated, horizontally inclined, flat wall having opposed longitudinal edges and positioned over said brace means and extending from one end of said framework elements toward the other end of said framework elements, said first wall having one of its longitudinal edges secured to one longitudinal edge of said elongated framework elements, and said first wall having a channel formed therein and extending the length thereof;
  (d) a second elongated flat wall having opposed longitudinal edges and projecting from the other longitudinal edge of said first wall to one of the longitudinal edges of the other of said framework elements and forming with said first wall, a generally V-shaped trough supported between said framework elements on said brace means;
  (e) an endless chain conveyor having reaches passing over and under said first wall with the reach passing over said wall being positioned in said channel and below the major plane of the channeled surface of the first wall;

(f) at least one flight connected to said endless chain conveyor and projecting therefrom for extension from the channel in said first wall as said endless chain conveyor passed therethrough;

(g) sprocket means positioned at opposite ends of said first wall for supporting said endless chain conveyor; and (h) A motor drivingly connected to said sprocket means for driving said endless chain conveyor.

2. A material-moving device as claimed in claim 1 and further characterized to include a pair of wing guides detachably connected to said framework elements and each extending transversely outwardly from one of said framework elements, said wing guides each having a pair of transversely extending material-supporting plates disposed in a common plane with the free longitudinal edges of each of the walls of said V-shaped elongated trough for supporting flat material wider than said V-shaped elongated trough during conveyance by said material-moving device.

3. A material-moving device as claimed in claim 2 and further characterized to include a pair of channel guides secured to the transversely outer ends of the material-supporting plates for retaining said flat material against transverse shifting relative to said wing guides during conveyance by said material-moving device.

4. A material-moving device as claimed in claim 1 wherein each of said framework elements is a segmented structure having an extension portion and a pair of end portions, said extension portion being detachably connected to said end portions, and said end portions being detachably connectable to each other;

and wherein said trough is comprised of two portions detachably connected in end-to-end relation.

5. A portable material-moving device for horizontally and vertically conveying miscellaneous materials comprising:

(a) a pair of horizontally spaced, elongated generally rectangular lattices, each having a first end and a second end;

(b) a plurality of braces interconnecting the lattices and sloping horizontally between said lattices when said lattices each rest upon the ground and occupy a vertical plane;

(c) a first elongated, generally rectangular, horizontally inclined flat wall having opposed longitudinal edges and positioned over said braces and extending from one of said lattices toward the other of said lattices, said first wall having one of its longitudinal edges secured to one longitudinal edge of said one lattice, and said first wall having a channel formed therein and extending the length thereof;

(d) a second elongated, generally rectangular, flat wall having opposed longitudinal edges and projecting from the other longitudinal edge of said first wall to one of the longitudinal edges of said second lattice and forming with said first wall a generally V-shaped trough supported between said lattices on said braces;

(e) an endless chain conveyor having reaches passing over and under said first wall with the reach passing over said first wall being positioned in said elongated channel and below the major plane of the grooved surface of said first wall;

(f) at least one flight detachably connected to said endless chain conveyor and projecting substantially normal thereto for extension from the channel in said first wall as said endless chain conveyor passes therethrough;

(g) sprocket means connected to said braces at each end of said first wall for supporting said endless chain conveyor; and (h) a motor drivingly connected to said sprocket means for driving said endless chain conveyor.

6. A portable material moving device for horizontally and vertically conveying miscellaneous materials comprising:

(a) a pair of horizontally spaced elongated framework elements, each having a first end and a second end;

(b) brace means interconnecting said framework elements and extending between said framework elements at an incline to the horizontal when said framework elements rest upon the ground and extend in a generally vertical direction;

(c) an elongated, horizontally inclined first wall positioned over said brace means and including at least one elongated material supporting member extending substantially normal to said brace means over a major portion of the length of said framework elements, said first wall further including a channel extending the length thereof;

(d) a flat, elongated, generally rectangular second wall having opposed longitudinal edges and intersecting the major plane of said first wall to define therewith a generally V-shaped material supporting structure, said second wall extending from the major plane of said first wall to one of the longitudinal edges of one of said elongated framework elements;

(e) an endless chain conveyor having reaches passing over and under said first wall with the reaches passing over said first wall being positioned in said channel and below the major plane of said first wall;

(f) at least one flight connected to said endless chain conveyor and projecting therefrom for extension from the channel in said first wall as said endless chain conveyor passes therethrough;

(g) sprocket means positioned at opposite ends of said first wall for supporting said endless chain conveyor; and (h) a motor drivingly connected to said sprocket means for driving said endless chain conveyor.

7. A portable material moving device for horizontally and vertically conveying miscellaneous materials comprising:

(a) a pair of horizontally spaced, elongated framework elements of adjustable length and each having a first end and a second end;

(b) brace means interconnecting said framework elements and including braces inclined to the horizontal between said framework elements when said framework elements rest upon the ground and extend in generally vertical directions;

(c) an elongated material supporting member positioned over and supported by said inclined braces, and forming with said inclined braces, a material supporting surface inclined with respect to the horizontal when said elongated framework elements rest upon the ground and each occupies a substantially vertical plane;

(d) conveyor supporting means extending the length of said elongated material supporting member and parallel thereto;

(e) an elongated, generally rectangular flat wall having opposed longitudinal edges and intersecting said material supporting surface, said elongated generally rectangular flat wall extending from its line of intersection with the material supporting surface to one of the longitudinal edges of one of said elongated extensible framework elements;

(f) an endless chain conveyor having one reach passing under said material supporting surface and a second reach positioned on, and supported by, said conveyor supporting means;

(g) at least one flight connected to said endless chain conveyor and extending substantially normal thereto for projection from the material supporting surface as the endless chain conveyor passes over said conveyor supporting means.

(h) sprocket means connected to said brace means at each end of said material supporting surface for engagement with said endless chain conveyor; and (i) a motor divingly connected to said sprocket means for driving such endless chain conveyor.

References Cited by the Examiner

UNITED STATES PATENTS

| | | | |
|---|---|---|---|
| 1,885,935 | 11/32 | McAllister | 198—173 X |
| 2,387,220 | 10/45 | Wehle | 198—173 |
| 2,760,622 | 8/56 | Magee | 198—173 |
| 2,768,731 | 10/56 | Anderson | 198—126 |
| 2,837,203 | 6/58 | Reeser | 198—204 |
| 2,951,579 | 9/60 | Stauth | 198—204 |

FOREIGN PATENTS

| | | |
|---|---|---|
| 54,512 | 6/20 | Sweden. |

OTHER REFERENCES

Article: Package Conveyor From American Journal of Ry. Appliances, 12–1–84.

SAMUEL F. COLEMAN, *Primary Examiner.*

EDWARD A. SROKA, *Examiner.*